No. 783,570.

Patented February 28, 1905.

UNITED STATES PATENT OFFICE.

CARLETON ELLIS, OF BOSTON, AND HARRY B. CHALMERS, OF DEDHAM, MASSACHUSETTS.

PROCESS OF TREATING LIME.

SPECIFICATION forming part of Letters Patent No. 783,570, dated February 28, 1905.

Application filed July 28, 1903. Serial No. 167,330.

*To all whom it may concern:*

Be it known that we, CARLETON ELLIS, of Boston, in the county of Suffolk, and HARRY B. CHALMERS, of Dedham, in the county of Norfolk, State of Massachusetts, have invented certain new and useful Improvements in Processes of Treating Lime, of which the following is a specification.

If quicklime be slaked with about thirty per cent. of its weight of water, a dry powder results, which consists largely of calcium hydroxid. This product, commercially known as "hydrate of lime," would find an extended use as the basis of wall-plaster were it not for its peculiar physical properties.

Lime which has been slaked with a large excess of water above that required for chemical combination forms the ordinary slaked lime or lime-putty. Mortar for plastering made from this is easily applied to the walls and spread to the thickness desired. The trowel glides over the surface of the plaster readily and produces a smooth even finish. Such plaster-mortar is characterized by its ease of working. The case is very different with mortar made by mixing commercial dry hydrate of lime and water. In this case the mortar does not work freely. It sticks to the trowel, does not spread properly, and requires much time and effort to apply. In general plasterers will not use such a mortar, condemning it as "dragging under the trowel." Dry hydrate of lime would find a wide use in plastering operations were it not for this tacky or adhesive quality. Hydrate of lime possesses another defect of a physical sort. It is so light and feathery a powder that the handling of it is very disagreeable. The powder is so fine that it sifts through sacks or barrels in which it is contained and charges the atmosphere with caustic dust which is unpleasant and even dangerous to inhale.

It is the object of this invention to produce from quicklime a basic hydrated compound which works freely under the trowel, is dense enough to be readily handled, has all the good qualities of ordinary slaked lime, and is rid of the defects common to hydrate of lime. To accomplish this, we make use of the following principles: Oxid of lime is capable of uniting with numerous mineral salts to form oxy or basic salts. We find that if the mineral salt be in aqueous solution when added to the quicklime the latter simultaneously hydrates and combines with the mineral salt to form a hydrated basic salt. Such basic or oxy salts differ in appearance from hydrate of lime. They are denser and with water they produce a more unctuous paste.

To carry out our process, we therefore add a quantity of a suitable mineral salt to the water which is to be used for slaking. A sufficient quantity of this solution is then added to the quicklime to slake it to a dry pulverulent powder. The slaked powder contains more or less basic salt, according to the concentration of the mineral-salt solution employed.

The salts which may be used in our process are the sulfates of alumina or zinc, the acetates of alumina, zinc, calcium or magnesium or barium, and the chlorids of zinc, calcium, and magnesium. Nitrates may be used, but are more costly and are not as efficient. The most satisfactory class of salts we find to be the soluble chlorids, chlorid of calcium and especially magnesium being the most efficient. We prefer, therefore, to employ this latter salt. It has further the advantage of being cheap and easily obtained, being a by-product from certain chemical works. The quantity of these salts required to develop the desired qualities in the slaked product need not exceed five per cent. of the weight of the quicklime employed. When chlorid of magnesia is used, one per cent. is sufficient to produce a marked change. The slaked product is dense and as a plastering material is easily manipulated. It may be spread with the greatest ease. There is no evidence of "drag." It spreads, in fact, more easily and smoothly than does ordinary wet slaked lime.

Some kinds of lime do not require even as much as one per cent. of magnesium chlorid. One-fourth to one-half of one per cent. is frequently sufficient to produce a product for plastering purposes which will not drag. That so small a quantity of this salt is able to produce such changes in the slaked product is due to its remarkable property of forming basic compounds. Each little particle of the slaked product contains a minute amount of oxychlorid, which exerts a specific influence on the density and spreading qualities. Otherwise the product sets or hardens exactly like plaster made from ordinary wet slaked lime.

The procedure of slaking to a dry powder may be carried out in several different ways, all of which accomplish the same end—viz., the bringing together of quicklime and a saline solution and in agitating the mixture until the reaction is complete. An old and well-known method of making dry hydrate of lime consists in placing the quicklime in a vat and in sprinkling on water, with stirring, until the lime is hydrated. Using a mineral-salt solution instead of water, we are able to resort to the above procedure in treating lime by our process.

Our product may also be made by mixing a portion of the lime with an excess of the mineral-salt solution. This will give a paste or putty which may afterward be converted into a dry powder by the addition of more lime.

Both of these methods may be made continuous. For instance, the lime and the mineral-salt solution may be combined and fed into one end of a mixing-trough and continuously discharged from the other end as the slaked product, or a lime-putty containing an excess of the salt solution may be mingled with as much quicklime as is necessary to combine with the excess of salt solution and this mixture may be continuously delivered to an agitator and discharged from this as a dry powder.

We do not limit ourselves to any particular method of combining the lime and saline solution, but prefer to employ a means which will produce the slaked product in a continuous way.

What we claim as our invention, and desire to secure by Letters Patent, is—

1. The herein-described process which consists in completely hydrating quicklime to a dry pulverulent condition with a dilute solution of a metallic salt capable of forming an insoluble oxychlorid with the lime.

2. The herein-described product consisting of a dry pulverulent completely hydrated oxid of lime containing an insoluble basic oxychlorid precipitated throughout its mass.

In testimony whereof we have affixed our signatures in presence of two witnesses.

CARLETON ELLIS.
HARRY B. CHALMERS.

Witnesses:
WILLIAM A. FOSTER,
WM. L. BAKER.